Patented Nov. 25, 1930

1,783,137

UNITED STATES PATENT OFFICE

WALTHER PENECKE, OF GRAZ, AUSTRIA, ASSIGNOR TO FELICE BENSA, OF GENOA, ITALY

PROCESS FOR MANUFACTURING A GREEN VAT DYESTUFF FROM 1.12 PERYLENE QUINONE

No Drawing. Application filed January 5, 1928, Serial No. 244,772, and in Austria November 19, 1927.

As is well known 1,12 dihydroxy perylene is obtained by condensing β dinaphthol by means of aluminium chloride, such 1,12 dihydroxy perylene being converted into 1,12 perylene quinone by contact with air or by oxidizing agents.

My invention consists in condensing 1,12 perylene quinone together with benzoyl chloride by means of aluminium chloride at a temperature of 140 to 180° centigrade, whereby a vat dye stuff is obtained, which is capable of dyeing cotton with a green colour.

Example 1 part by weight of finely powdered 1,12 perylene quinone is mixed with four parts by weight of powdered anhydrous aluminium chloride and to this mixture is added under agitation 1½ parts by weight of benzoyl chloride. The mixture undergoes a reaction without heating which is characterized by foaming and the mass assumes the form of a thin paste. This paste is allowed to stand, and thereupon solidifies. This solidified paste, in a suitable reaction vessel, is then surrounded by a bath which is heated to a temperature of 165° C., and is kept at this temperature for one hour. While subjected to the temperature of the bath the paste is continually agitated. Following this step the paste is cooled and is then treated with water containing hydrochloric acid, by which it is decomposed. The liquid is then removed from the product by filtration.

The precipitate from which the liquid has been filtered off is in the form of a dark powder when dried. This powder is purified by dissolving it in water containing sodium hydroxide and sodium hydrosulphite. After filtration the resulting dye stuff is separated from the solution by blowing in air. By treating 1,12 perylene quinone and benzoyl chloride, according to the invention, a dye stuff is obtained which probably has the constitional formula

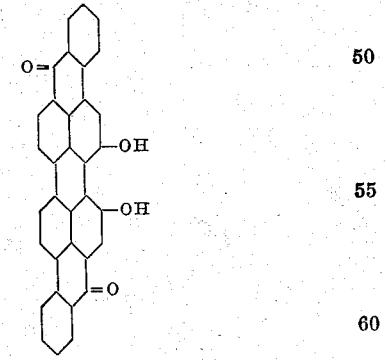

The purified dye stuff forms a dark powder with bronze lustre, which dissolves in concentrated sulphuric acid with a dull violet colour. The precipitate obtained from this solution by water is dark blue. In nitro benzene the substance dissolves with a violet colour and brownish violet fluorescence. The alkaline hydrosulphite vat is blue and cotton immersed in it takes on a blue color which turns green on exposure to air. Acids impart to cotton so colored a bluish tinge, but on washing with water the original colour is restored. The output is 80 to 90% of the quinone used.

What I claim is:

A process for manufacturing a vat dye stuff from 1,12 perylene quinone consisting in that 1,12 perylene quinone is condensed with benzoylchloride by means of aluminium chloride at 140 to 180° centigrade.

In testimony whereof I have affixed my signature.

WALTHER PENECKE.